July 3, 1923.

L. DEAN

SPOKE

Filed April 10, 1922

1,460,536

Lyndon Dean
INVENTOR
BY Victor J. Evans
ATTORNEY

WITNESS: G. B. Anderson

Patented July 3, 1923.

1,460,536

UNITED STATES PATENT OFFICE.

LYNDON DEAN, OF TALOGA, OKLAHOMA.

SPOKE.

Application filed April 10, 1922. Serial No. 551,114.

*To all whom it may concern:*

Be it known that I, LYNDON DEAN, a citizen of the United States, residing at Taloga, in the county of Dewey and State of Oklahoma, have invented new and useful Improvements in Spokes, of which the following is a specification.

My present invention has reference to a vehicle wheel construction.

In carrying out my invention, I propose to produce a wheel in which the spokes thereof are adjustably associated with the felly, and whereby expansion or contraction of the wheel rim may be compensated for as well as any looseness between the spokes and felly.

A further object is to produce a vehicle wheel in which the spokes are adjustably associated with the felly and wherein the adjusting means is effectively housed to protect the same from dust, dirt, moisture, etc.

Other objects and advantages will present themselves as the nature of the invention is better understood, reference being had to the drawing which accompanies and which forms part of this application.

In the drawing:—

Figure 1:
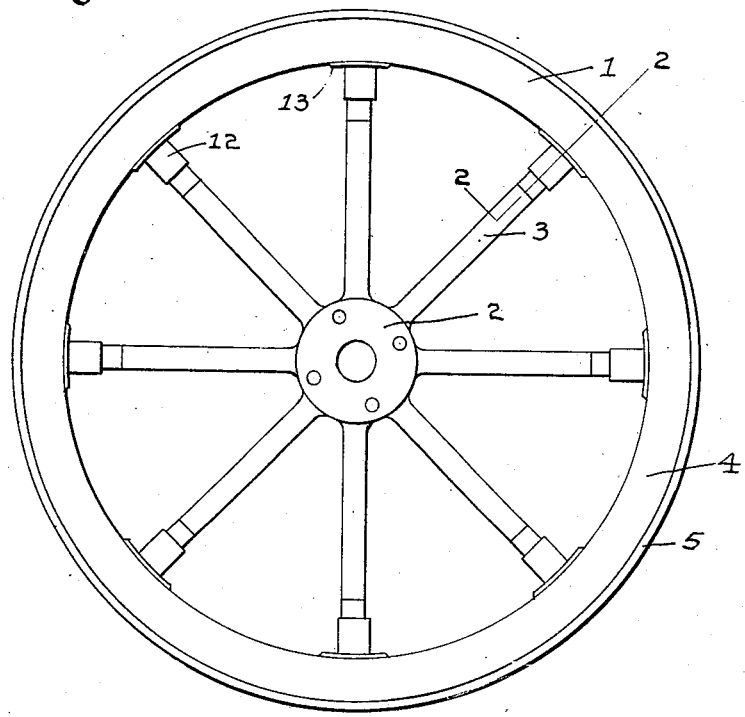
Figure 1 is a side elevation of a vehicle wheel in accordance with this invention.
Figure 3:
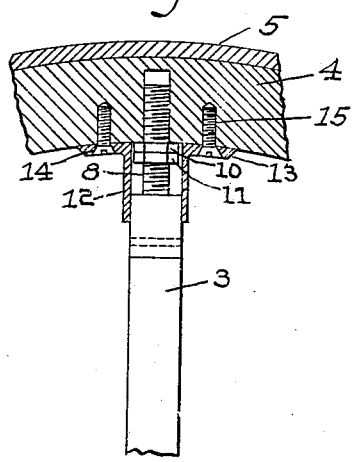
Figure 3 is a detail sectional view taken at right angles to the showing in Figure 2.
Figure 2:
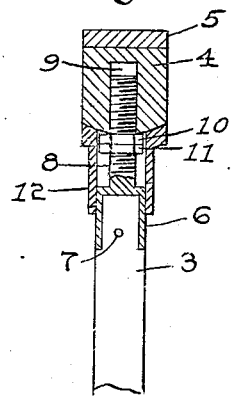
Figure 2 is a sectional view approximately on the line 2—2 of Figure 1.

In the drawing, the numeral 1 designates a vehicle wheel of an ordinary construction. From the hub 2 of the wheel radiate the spokes 3. The spokes 3 are of equal lengths and terminate a desired distance away from the felly 4. The felly 4 is provided with the usual metal tread band 5.

The spokes 3 have their outer ends reduced, the said reduced portions receiving thereover ferrules 6, suitable means 7 securing the ferrules on the spokes. Each ferrule 6 has an outwardly extending threaded portion in the nature of a bolt 8, and the felly 4 has sockets 9 entering from its inner edge and providing for the reception of the respective bolt members 8. Screwed on each of the bolts 8, and in contact with the inner edge of the felly 4 there is a nut 10. Also screwed on each bolt and in contact with the nut 10 there is a locking nut 11.

Surrounding the outer end of each of the ferrules 6 there is a socket member 12. Each socket is formed with a base portion 13, the same extending a suitable distance from the opposed faces, and if desired from the opposed sides of the sockets. The base portion 13 of the socket is concaved longitudinally to correspond with the cross sectional contour of the inner portion of the felly 4. The base 13 is provided with a pair of reamed openings that are designed to receive therein the heads 14 of screws 15. The heads 14 are kerfed so that the screws may be readily inserted in the felly, and if desired the felly may be provided with threaded openings for the reception of the screws.

When the tire band or rim 5 either expands or contracts under weather conditions, it is simply necessary for the operator to remove the screws 14, or to loosen the said screws sufficiently to permit of the socket members being slid over the ferrule ends of the spokes to obtain access to the nuts 11 and 12 to permit of the adjustment of the said nuts on the bolt ends of the ferrules so that proper adjustment may be made between the spokes and the felly to compensate for the expanded or contracted band 5. The device, as previously stated, not only provides for adjusting contracted or expanded rim bands, but also for irregularities between the spokes, the hub and the felly, and it is thought that the foregoing description when taken in connection with the drawing will fully set forth the construction and advantages of the improvement to those skilled in the art to which such inventions relate, it being understood that details of construction may vary in accordance with the class of vehicle wheels upon which the improvement is supplied, and consequently I hold myself entitled to all such changes from the illustrated embodiment as fall within the scope of what I claim.

Having described the invention, I claim:—

1. The combination with a vehicle wheel, of a means for compensating for the expansion and contraction of the tread band on the felly of a wheel, comprising threaded members extending from the spokes of the wheel and received in the felly, adjustable means on said threaded members in contact with the inner face of the felly, and means removably secured to the felly enclosing the threaded members and the adjustable means thereon.

2. The combination with a vehicle wheel, of a means for compensating for irregularities between the rim band and felly of the wheel and for adjusting spokes with respect to the hub and felly of the wheel, comprising a wheel in which the spokes thereof terminate a distance from the felly, a ferrule on the end of each spoke having a bolt extension freely received in the felly, a binding nut and a locking nut on each bolt, the former in contact with the felly, and a socket removably secured to the felly surrounding the nuts and receiving therein a portion of the ferrule.

In testimony whereof I affix my signature.

LYNDON DEAN.